United States Patent
Licker et al.

(10) Patent No.: US 8,313,788 B2
(45) Date of Patent: Nov. 20, 2012

(54) METHOD FOR DEVELOPING A DAIRY PROTEIN CAKE

(75) Inventors: Jonathan L. Licker, McKinney, TX (US); Darrell L. Taylor, San Antonio, TX (US); Thomas A. Trezza, Plano, TX (US); Craig J. Weitz, Dallas, TX (US)

(73) Assignee: Frito-Lay North America, Inc., Plano, TX (US)

( * ) Notice: Subject to any disclaimer, the term of this patent is extended or adjusted under 35 U.S.C. 154(b) by 630 days.

(21) Appl. No.: 12/105,896

(22) Filed: Apr. 18, 2008

(65) Prior Publication Data
US 2009/0263553 A1  Oct. 22, 2009

(51) Int. Cl.
*A23L 1/18* (2006.01)

(52) U.S. Cl. ........ 426/559; 426/516; 426/550; 426/560; 426/656

(58) Field of Classification Search .................. None
See application file for complete search history.

(56) References Cited

U.S. PATENT DOCUMENTS

| | | | |
|---|---|---|---|
| 3,800,050 A | 3/1974 | Popel | |
| 3,873,748 A | 3/1975 | Schwab et al. | |
| 3,925,567 A | 12/1975 | Abe | |
| 3,978,236 A * | 8/1976 | Sair et al. | 426/445 |
| 5,051,133 A | 9/1991 | Nagai et al. | |
| 5,102,679 A | 4/1992 | Whalen | |
| 5,405,625 A | 4/1995 | Biggs | |
| 6,224,933 B1 | 5/2001 | Bhaskar et al. | |
| 6,242,033 B1 | 6/2001 | Sander | |
| 6,242,034 B1 | 6/2001 | Bhaskar et al. | |
| 6,309,680 B1 | 10/2001 | Lim et al. | |
| 6,432,463 B1 | 8/2002 | Bhaskar et al. | |
| 6,607,767 B1 | 8/2003 | Malfait | |
| 6,607,777 B1 | 8/2003 | Walsh et al. | |
| 6,676,983 B2 | 1/2004 | Malfait | |
| 7,597,921 B2 * | 10/2009 | Walsh et al. | 426/583 |
| 2003/0134023 A1 | 7/2003 | Anfinsen | |

(Continued)

FOREIGN PATENT DOCUMENTS

| | | |
|---|---|---|
| GB | 1262510 A | 2/1972 |
| JP | H9-331124 | 6/1999 |
| WO | 2008019423 A1 | 2/2008 |

OTHER PUBLICATIONS

R.Chinnaswamy, et al., "Extruded Snack Foods: Relationships between ingredient chemical qualities and expansion properties", Dept. of Agricultural Engineering, Food Science and Technology Universtity of Nebraska- Lincoln, IFI NR-3, 1990, 5 pages.

*Primary Examiner* — Lien Tran
(74) *Attorney, Agent, or Firm* — Colin P. Cahoon; Celina M. Orr; Carstens & Cahoon, LLP

(57) ABSTRACT

A method for producing a shelf-stable protein-based pellet that is capable of expansion into a light, crispy snack cake, while providing a good source of protein and calcium. The method, in preferred embodiments, involves making dough from tapioca and potato starches and a milk protein derivative consisting of whey protein isolate, milk protein isolate or calcium caseinate. The mixture is extruded, sliced and dried in a series of dyers. The method produces a shelf-stable pellet having a moisture level of approximately 9-13% by weight which is further processed to produce a puffed dairy protein snack product, having a moisture level typically less than 2%.

21 Claims, 1 Drawing Sheet

U.S. PATENT DOCUMENTS

| | | |
|---|---|---|
| 2005/0053715 A1 | 3/2005 | Dolores-Martinez-Serna Villagran et al. |
| 2005/0266137 A1 | 12/2005 | Eppler et al. |
| 2006/0083840 A1 | 4/2006 | Casper et al. |
| 2006/0083842 A1 | 4/2006 | Miller |
| 2007/0264392 A1 | 11/2007 | Maejima et al. |
| 2008/0102165 A1* | 5/2008 | Ning et al. .................. 426/72 |

* cited by examiner

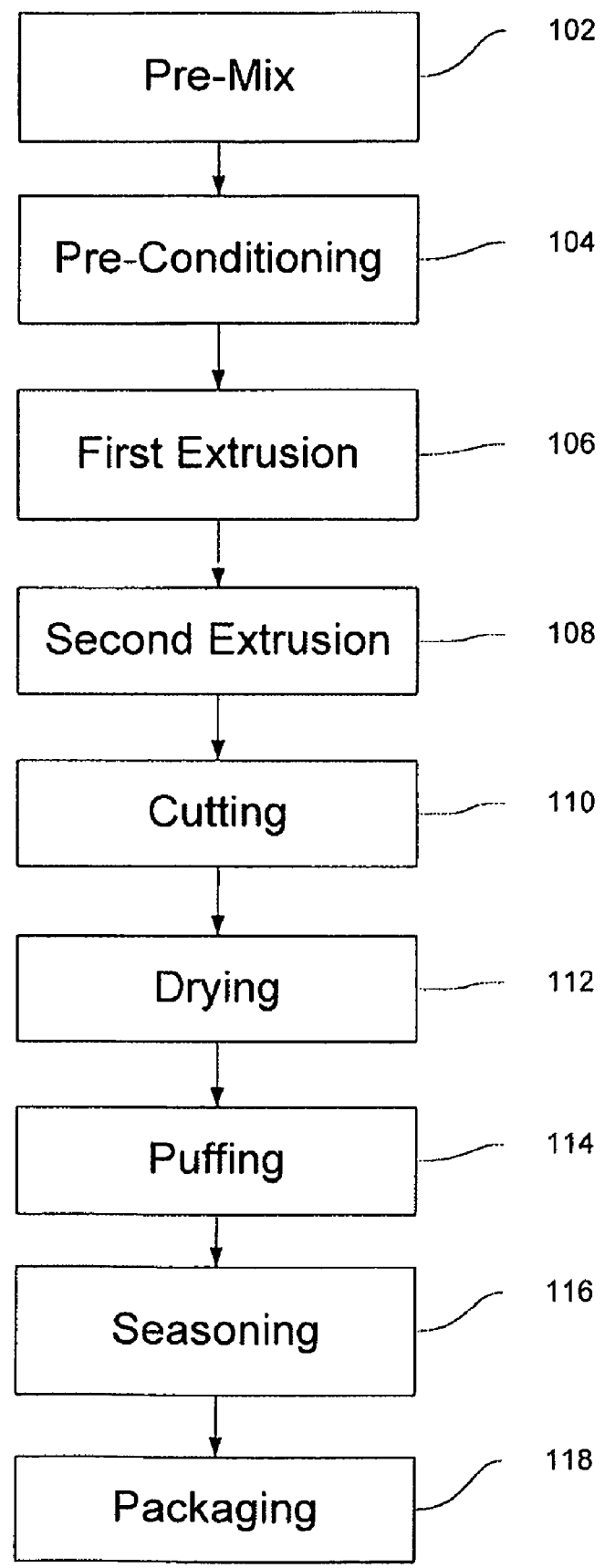

METHOD FOR DEVELOPING A DAIRY PROTEIN CAKE

BACKGROUND OF THE INVENTION

1. Technical Field

The present invention relates to the production of a dairy-based "cake" snack similar in texture to a puffed rice cake. More specifically, the present invention relates to a method for producing a starch and protein based pellet and the resultant puffed food product that can be made therefrom with little to no browning.

2. Description of Related Art

Busy schedules continue to make snacking a popular means to satisfy hunger in between meals or on the go. Many successful snack products have been made in the form of convenient and quick cakes of puffed corn and rice. These products meet the quick demands of consumers and provide a good source of carbohydrates and other nutrients, but it has proven difficult to further fortify such snacks with protein.

The versatility of rice to form a crispy, light and convenient puffed snack has long been known and celebrated. Although methods for making puffed food products from corn or rice pellets are well known in prior art, methods for making a shelf-stable pellet that is protein based and conducive to puffing without excessive browning are not known in the prior art. Conventional grain cake products are mostly derived from rice and cereal grains, since rice is capable of relatively easy expansion into a self supporting cake. Because of the browning problem presented when using, for example, lactose, prior art has not successfully incorporated a dairy based protein into a popped food product.

The advantages of creating such a protein based product are numerous. In today's growing health-conscious but fast paced world, consumers are always on the lookout for new and different ways to enjoy protein and dairy based products. While the explosion of interest in protein was triggered by high-protein diets designed to promote weight loss, there is no denying that the body needs all kinds of different proteins to function at its best. Beef jerky and tuna are easy sources of protein, but they do not offer the crispy texture of a traditional rice puffed cake. Meal replacement and protein bars do not provide the benefits of a low calorie treat. Further, other sources such as protein shakes and fish do not offer the convenience and easy storage of a puffed cake. The present invention has set out to solve this problem.

The production in the prior art of a puffed extruded product typically involves the application of heat and pressure on an intermediate pellet. Generally, methods known in the art rely primarily on moisture content in the grains for puffing. Pellets provide excellent textural features, produce a high quality puffed product, and allow for long periods of storage prior to production of a puffed food product. Further, the use of an intermediate pellet allows for a more precise control of moisture content. The moisture content can be varied by many processes, such as: drying, cooking, tempering and parboiling.

As is generally well known, browning reactions are very complex and a host of different products may be formed from sugars, depending on the conditions used. High temperature, high relative humidity, and alkaline conditions all promote browning when working with reducing sugars found in milk and dairy products, such as lactose. Attempts to use milk and dairy products in a puffed food frequently result in poorly characterized odor and flavor molecules due to browning reactions. Further, the browning reactions of the reducing sugars lead to reduced protein quality, resulting in the use of mainly corn derived sugars rather than proteins. The successful introduction of dairy protein has in the past proven unsuccessful in the formation of a food starch pellet to be used for expansion into a puffed food product, which provides an efficacious dose of protein and/or calcium.

Modern nutrition trends have seen the increased popularity of diets high in protein as well as low in fat. Despite the improvements being made in the field of making puffed snack cakes from food starches, insufficient attention has been given to incorporating dairy proteins into the snack cake due to the problem caused by reducing sugars. A need therefore exists for a method of producing a dairy protein-based protein pellet. Further, a need exists for such protein pellet to be suitable for producing a puffed dairy protein snack product having a light and crispy texture. Ideally, such method should be economical and utilize equipment common to the food processing industry. The present invention solves this problem and provides the advantage of increased health benefits.

SUMMARY OF THE INVENTION

The present invention produces a shelf-stable pellet made from starches and milk protein derivatives, used to produce a puffed dairy-based cake snack with a high amount of protein. To reduce browning resulting from the Maillard reactions between the starches and milk proteins, the invention involves developing a formulation for a starch/protein based dry premix with, in a preferred embodiment, similar hydration profiles. Further, by utilizing specific milk protein derivatives with similar particle sizes to at least one of the starches, starch hydration and gel formation is ensured. In one embodiment, the present invention utilizes calcium caseinate as the milk protein derivative. In another embodiment, the present invention uses whey protein isolate. In a third embodiment, milk protein isolate is used as the milk protein derivative.

The process, in a preferred embodiment, comprises a two stage extrusion process, wherein the dry blend of the ingredients is first preconditioned. The resultant extrudate is then sliced and dried in a series of dryers. Processing conditions also allow for a finished product with little to no browning. The end result is a pellet having a moisture level of approximately 9-13% by weight. The pellets are then expanded into a puffed cake using a rice cake popper and packaged for later sale and consumption.

The invention provides for an economical method for making a dairy protein-based puffed food starch product from milk protein derivatives. Preferred embodiments utilize tapioca and potato starches mixed with whey protein isolate, milk protein isolate or calcium caseinate. Further, the method produces a dairy protein-based pellet suitable for use as an intermediate product in the making of a puffed-protein based snack having a light and crispy texture, as well as a good source of protein and calcium with little to no browning and browning associated with off flavors.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

FIG. 1. is a flow chart of the overall process of one embodiment of the invention.

DETAILED DESCRIPTION

Milk proteins are extracted from whole milk by using various processes. Some methods use acids or charcoal, others use physical means such as grading screens. Each extraction process retains certain nutritional qualities and offers different qualities and properties of milk protein ingredients. Milk protein can be categorized as caseins, whey proteins, and proteins associated with the lipid phase. The casein fraction comprises about 80% of the total protein content of milk. Caseins are a family of related phosphoproteins precipitated from raw skim milk at pH 4.6 and 20 C as casein micelles with associated calcium. A soluble caseinate can be obtained by raising pH to 6.7. Whey protein, which comprises 20% of the total protein content of milk, is one of the few proteins that are soluble at low pH levels, at which proteins from other sources coagulate and settle out.

An embodiment of the innovative invention will now be described with reference to FIG. 1. Dry ingredients comprising tapioca starch, potato starch, and a milk protein derivative are mixed together in a batch premix step 102 characterized as a low shear blending of the dry ingredients. It is believed that the milk proteins work well in the expansion of the tapioca and potato starches, in part, due to their cross-linking abilities with the amylose contents of the starches at 17% and 21%, respectively. As the degree of cross-linking increases, the amount of expansion decreases. It is also beneficial to use compounds with similar hydration profiles so that the protein and starch will become fully gelatinized. As used herein, the term "hydration profiles" refers to the water binding properties of the molecules, specifically, the affinity and rate of water absorptions. The closer equilibrated the hydration rates, the more successful the gelatinization process and the less likely that browning will occur as a result of Maillard reactions. The use of similar particle sizes also ensures successful gel formation and reduces browning. The particles sizes for at least one of the starches used, in this case that of the potato starch, typically falls in the range of 8 to 100 microns; while those of the milk protein derivatives typically fall in the range of 10 to 200 microns. Consequently, both the milk protein component and at least one of the starch components have particle sizes within the range of 8 to 200 microns.

Many ingredients will influence the properties of a heated starch-water dispersion. Among the ingredients that influence the ultimate paste viscosity and gel strength is sugar, specifically the lactose of the milk derivatives. Sugar will essentially compete with starch for the water and this can lead to lumping and delay starch hydration. When in lumps, the outside layers take up water and become more viscous preventing additional water molecules from reaching the interior where the granules are in need of more water for further gelatinization. Water-binding properties and polymer-polymer interactions are important to gel formation. Different sugars will have different influences in the gelatinization process. The current invention combines starches with milk proteins that have been processed to decrease the high amounts of sugar and consequently have similar hydration profiles.

In one preferred embodiment, the milk protein derivative used is calcium caseinate. This milk derivative is synthesized from dried skim milk and is comprised of 92% protein. Calcium caseinate protein breaks down at a slower rate than whey protein, thus supplying the body with a constant flow of amino acids and a sustained protein release. This also eliminates a catabolic environment. Calcium caseinates exhibit minimum water absorption, are nutritional, and provide an excellent source of calcium. These properties make calcium caseinates ideal for use in infant formulas, nutritional powders, calcium fortifications, and nutrition bars. Suitably commercially available calcium caseinate for use in the dough, for example, is sold by Mainstreet Ingredients.

In another preferred embodiment, the milk protein derivative is whey protein isolate. Whey is the serum or watery part of milk containing sugar, minerals and lactalbumin that is separated from the thicker or more coagulable curds found in cheese production. Whey protein is a pure, natural, high quality protein, rich in essential amino acids. Whey protein isolate is the most pure and concentrated form of whey protein. Whey protein concentrate has anywhere between 29% and 89% protein and 8% sugar, depending upon the product. Isolate is filtered better than concentrate and made from fresh sweet dairy to yield a higher protein percentage, leaving out the fat, carbohydrates, ash and moisture. It contains 90% or more protein, depending on the filtration process, and little to no fat, lactose or cholesterol. Suitably commercially available whey protein isolates for use in the dough include, for example, Davisco BiPro™ Whey Protein Isolate, available from Davisco.

In another preferred embodiment, the milk protein derivate is milk protein isolate. Milk protein isolates, which are approximately 90% protein, 1% fat and 0.2% lactose, are prepared by ultra filtration and ion exchange processing techniques. These highly soluble protein mixtures are useful in bakery products, liquid nutritional supplements and many other types of foods. Their low ash (mineral) content is important in minimizing off-flavor contributions. Milk protein isolate is a mixture of all of the proteins found in milk (whey and casein). It has a strong amino acid profile derived from both its whey and casein components and it likely retains many of the functional properties of these two components. Suitably commercially available milk protein isolates for use in the dough include, for example, Ultranor™ available Kerry. Table 1, below, shows the composition of the milk protein isolate used in the instant invention. As with any organic material, there may be some variation in the chemical composition and the information given is approximate.

TABLE 1

| Typical chemical composition of milk protein isolate | |
|---|---|
| Fat % | 1.5 |
| Protein % | 86 min. |
| Moisture % | 4 |
| Ash % | 6 |
| Carbohydrate % | <1 |
| -of which is Lactose % | <1 |

The following examples are provided to illustrate the composition of the dough of the present invention and are not intended to limit the scope thereof in any manner. These examples list the dry ingredients by weight percentage at the premix step 102 in preparation of the dough to be expanded. As evident by the examples, the dough contains approximately 21.8% to 29% tapioca starch by weight, 25% to 37% potato starch by weight, and 35% to 45.25% milk protein by weight. Examples 4-8 employ the use of an emulsifier. Emulsifiers, when mixed with water, tend to align themselves at the water interface to reduce the interfacial tension in the zone. Consequently, mono or diglycerides are also used in small quantities to form the desired dough composition. Salts are also used in small quantities to generally improve the expansion abilities of the end product. Generally, salt increases the dextrinization of a starch during puffed extrusion.

EXAMPLE 1

A composition of the present invention comprises the following individual components at the indicated amounts.

| INGREDIENT | AMOUNT (By Weight Percentage) |
| --- | --- |
| BiPro Whey Protein Isolate | 35.00 |
| Salt, Cereal | 0.75 |
| Potato Starch | 37.00 |
| Tapioca Starch | 27.25 |

EXAMPLE 2

A composition of the present invention comprises the following individual components at the approximate indicated amounts.

| INGREDIENT | AMOUNT (By Weight Percentage) |
| --- | --- |
| Calcium Caseinate | 35.00 |
| Salt, Cereal | 0.75 |
| Potato Starch | 37.00 |
| Tapioca Starch | 27.25 |

EXAMPLE 3

A composition of the present invention comprises the following individual components at the indicated amounts.

| INGREDIENT | AMOUNT (By Weight Percentage) |
| --- | --- |
| BiPro Whey Protein Isolate | 45.2500 |
| Salt, Cereal | 0.7500 |
| Potato Starch | 25.0000 |
| Tapioca Starch | 29.0000 |

EXAMPLE 4

A composition of the present invention comprises the following individual components at the indicated amounts.

| INGREDIENT | AMOUNT (By Weight Percentage) |
| --- | --- |
| BiPro Whey Protein Isolate | 35.00 |
| Salt, Cereal | 0.60 |
| Potato Starch | 36.60 |
| Tapioca Starch | 26.80 |
| Emulsifier | 1.00 |

EXAMPLE 5

A composition of the present invention comprises the following individual components at the indicated amounts.

| INGREDIENT | AMOUNT (By Weight Percentage) |
| --- | --- |
| BiPro Whey Protein Isolate | 45.00 |
| Salt, Cereal | 0.60 |
| Potato Starch | 31.60 |
| Tapioca Starch | 21.80 |
| Emulsifier | 1.00 |

EXAMPLE 6

A composition of the present invention comprises the following individual components at the indicated amounts.

| INGREDIENT | AMOUNT (By Weight Percentage) |
| --- | --- |
| Ultanor 9060 Milk Protein Isolate | 35.00 |
| Salt, Cereal | 0.60 |
| Potato Starch | 36.60 |
| Tapioca Starch | 26.80 |
| Emulsifier | 1.00 |

EXAMPLE 7

A composition of the present invention comprises the following individual components at the indicated amounts.

| INGREDIENT | AMOUNT (By Weight Percentage) |
| --- | --- |
| Ultanor 9060 Milk Protein Isolate | 45.00 |
| Salt, Cereal | 0.60 |
| Potato Starch | 31.60 |
| Tapioca Starch | 21.80 |
| Emulsifier (Dimodan) | 1.00 |

EXAMPLE 8

A composition of the present invention comprises the following individual components at the indicated amounts.

| INGREDIENT | AMOUNT (By Weight Percentage) |
| --- | --- |
| Calcium Caseinate | 35.00 |
| Salt, Cereal | 0.75 |
| Potato Starch | 34.00 |
| Tapioca Starch | 24.25 |
| Nutriose fiber FM | 5.00 |
| Emulsifier (Dimodan) | 1.00 |

Continuing with the explanation of a preferred embodiment, in a pre-conditioning step 104, steam and liquid water is added to the blended dry ingredients from the pre-mix step 102. A typical steam addition rate is about 60 lbs. per hour for a pre-mix flow of about 200 lbs. per hour. The water added in the preconditioner is maintained such that the sum of steam and water added will yield a moisture level of the preconditioned admix of between about 25% to about 37% by weight, and more preferably between about 28% and about 34% moisture by weight. This normally takes a dwell time of about 15 to 200 seconds, and more preferably 30 to 180 seconds, in a pre-conditioner such as a flighted continuous hydration and mixing unit. The dough formed by the pre-conditioning step 104 exits the pre-conditioner at a temperature of about 90° F. to about 150° F., and more preferably, about 100° F. to about 140° F.

The primary purpose of preconditioning is to hydrate and partially gelatinize the mix. By definition, gelatinization is a phenomenon that takes place in the presence of moisture and heat. The starch and protein granules require energy in the form of heat to open the molecular structure and initiate hydration. Steam provides a high degree of diffusion within the mix allowing for easy hydration, adhesion, and uniform distribution.

The preconditioned admix dough will next undergo a first extrusion step 106 through a twin screw extruder at approximately 1000 to 1400 psi for optimal mixing of the ingredients. An acceptable extruder is a twin screw model consisting of five barrel zones such as a BC-45 manufactured by Clextral, Inc. The prehydrated dough is first fed into the first zone and advanced by the action of the twin screw extruder in a continuous stream to flow through the barrel zones. In a preferred embodiment, barrel zone 1 is set between about 75° F. and about 110° F. Barrel zone 2 is set between about 75° F. and about 150° F. Barrel zone 3 is set between about 120° F. and about 270° F. Barrel zone 4 is set between about 150° F. and about 300° F. Barrel zone 5 is set between about 150° F. and about 325° F. The increased heating helps achieve the desired level of "cooking" by mechanical and thermal means. The screw speed is set between 155 and 175 RPM. The dwell time in the first extruder is typically about 15 to about 90 seconds, more preferably about 30 seconds to about 75 seconds. The extrudate exits the first extruder at a temperature of between about 150° F. to about 220° F., more preferably about 170° F. to about 210° F., with a moisture level of about 16% to about 32%, more preferably 18% to about 30%, and most preferably 20% to about 28%.

To obtain the required cross-linking of the polymers, resulting in the desired consistency of the dough, the extrudate is then, in the preferred embodiment, fed through a single screw extruder with no added heat at a range of 650-950 psi, in a second extrusion step 108. An acceptable single screw extruder for this second extrusion step is a Food Processing Extruder manufactured by The Bonnot Company. The product of the two-step extrusion is a cohesive dough rope of approximately 1-1.5 inch diameter, which is then fed through a die. ° The extrudate at the end of the second extrusion step typically has a temperature of about 100° F. to about 160° F., more preferably about 110° F. to about 150° F.

As the dough rope passes through the extruder and through the die holes to yield an extruded product, one or more blades sever the product to pellets of the desired length in a cutting step 110. By mounting the blades on the die plate itself with more than one knife, it is easier to achieve smaller sized pellets. A preferred pellet size is 2.5 to 3.5 g/100 pieces. In one embodiment, the die contains approximately 50 to 70 holes and four high speed blades at a cutting speed of 36.9 RPM. Given the through put rates previously described, this can produce about 2,000 lbs of pellets per hour. The dough at this stage comprises a moisture content of approximately 20% to 28%, and more preferably, approximately 22% to 26% upon exit.

After the dough is cut into pellets, the products are advanced to a drying stage 112 to reduce moisture levels. In one embodiment, the pellets are transferred to a 3 step drying process, conducted in three separate dryers in temperatures ranging between about 150° F. to about 185° F., and more preferably about 160° F. to about 175° F. In the first stage, pellets are transferred to a shaker drier to dry the surface of the pellets and prevent clumping. After approximately 5-11 minutes, and more preferably, 8 minutes of drying the pellets will comprise a moisture content of between about 18%-24%, and more preferably, between about 20-22%. The pellets are then pneumatically transferred from the shaker dryer into a secondary dryer, where they will remain for approximately 20-30 minutes, and more preferably, 25 minutes at a range of about 150° F. to about 185° F., more preferably about 160° F. to about 175° F. The pellets are then routed to a finishing drier for approximately 60-90 minutes, and more preferably, one hour and 15 minutes. At the end of the drying process 112, the finished pellet will contain between 7% to 15%, and more preferably 9% to 13% moisture by weight.

The dried protein and starch pellet may then either be stored in tempered warehouse conditions for up to 365 days or may be immediately processed. For example, once all the drying steps are complete, the pellets may be fed into a rice cake puffing platform 114. Puffing machines, with a plurality of chambers, are widely known and understood by those skilled in the art. Puffing machines comprise a number of generally circular puffing chambers, each having inner surfaces and a chamber volume. A bulk amount of pellets is placed into the chambers and caused to volumetrically expand. Increasing the pressure and the temperature in the chamber causes the pellets to become amorphous, and by quickly reducing the pressure in the chamber, the amorphous starch pellets expand into a puffed food product. The puffing phenomenon results from the sudden expansion of water vapor from moisture held within the starch material of the pellet and the rapid diffusion of the water vapor out of the pellet. Suitable puffing machines are manufactured by Real Foods, Ltd. at St. Peters, NSW, Australia and Ideal Snacks, Inc. at Liberty, N.Y., and contain a volumetric feed system for placing the pellets into the cylindrical chambers. Optionally, the chambers may be specially crafted to create more aesthetic shapes for consumers, such as moons or cheese wedges.

The moisture content of the final puffed dairy product is less than 2% by weight. The final puffed cake dairy snack also contains 15.25%-29% tapioca starch by weight, 17.5%-37% potato starch by weight, and 20%-45.25% milk protein derivative components by weight, with 5 grams of protein based on a 28 gram serving. Topical seasoning sprays, flavoring, oil and salt can be added to the finished product at an optional seasoning step 116. The products may then be packaged 118 for later sales and consumer consumption.

While the invention has been particularly described with reference to preferred embodiments, it will be understood by those skilled in the art that various changes in form and detail may be made therein without departing from the spirit and scope of the invention. For example, some of the steps in the process could be conducted by either batch or continuous processes. Other comparable ingredients can be substituted for those listed herein by one skilled in the art. The terms and expressions employed herein have been used as terms of description and not of limitation; and thus, there is no intent of excluding equivalents, but on the contrary it is intended to cover any and all equivalents that may be employed without departing from the spirit and scope of the invention.

What is claimed is:

1. A method for making a dairy protein based puffed food snack, said method comprising the steps of:
   a) Mixing dry ingredients comprising starch components and a milk protein component, wherein said starch components comprise potato starch and tapioca starch;
   b) Adding water to precondition said dry ingredients to form a dairy protein based dough having a moisture level of about 25% to about 37%;

c) Extruding the dough to form a dough rope wherein said dough comprises a moisture content of about 20% to about 28%, said extruding step comprising a two-step extrusion process having a first extruder and a second extruder;

d) Cutting the dough rope into dairy protein based pellets;

e) Drying the pellets to between 7% to 15% moisture by weight; and f) Puffing the pellets into a puffed cake using a rice cake popper, thus forming a dairy protein based puffed food snack.

2. The method of claim 1 wherein said milk protein component is chosen from the group consisting of whey protein isolate, calcium caseinate and milk protein isolate.

3. The method of claim 1 wherein both the milk protein component and at least one of the starch components have particle sizes within the range of 8 to 200 microns.

4. The method of claim 1 wherein step a) further compromises mixing salt with said starch and protein components.

5. The method of claim 1 wherein step a) further compromises optionally mixing an emulsifier with said starch and protein components.

6. The method of claim 1 wherein said dough produced by step b) comprises between about 28% and about 34% moisture by weight.

7. The method of claim 1 wherein the first extruder is a twin screw extruder and the second extruder is a single screw extruder, and wherein extrusion in the twin screw extruder comprises a screw speed of between about 155 rpm to about 175 rpm and increasing temperatures of up to 325° F.

8. The method of claim 1 wherein at the output of the extrusion step c), said dough rope contains a moisture content of about 22% to about 26% by weight.

9. The method of claim 1 wherein the drying process of step e) comprises temperatures between about 160° F. to about 175° F.

10. The method of claim 1 wherein the drying process of step e) is a three step process comprising:
   a shaker dryer stage in which the pellets are dried for approximately 5-11 minutes;
   a secondary dryer in which the pellets are dried for approximately 20-30 minutes; and
   a finishing dryer in which the pellets are dried for approximately 60-90 minutes.

11. The method of claim 1, wherein at the output of the drying process e), the pellets comprise a moisture level of 9 to 13%.

12. The method of claim 1 wherein the pellets puffing step f) comprises transferring a bulk amount of the pellets to a rice cake puffing platform and wherein said pellets are volumetrically expanded into a single puffed food product.

13. The method of claim 1 further comprising the step of:
   g) seasoning the puffed food snack.

14. A method for making a dairy protein based puffed food snack from a shelf-stable pellet used for expansion into said puffed food snack, said method comprising the steps of:
   a) Mixing dry ingredients comprising potato starch, tapioca starch and a milk protein derivative, said milk protein derivative selected from the group consisting of whey protein isolate, milk protein isolate and calcium caseinate;
   b) adding water to said dry ingredients of step a) to precondition said dry ingredients to form a dough having a moisture level of about 25% to about 37%; hydrating said dry ingredients
   c) extruding said dough using a two-step extrusion process to form a dough rope, the two-step extrusion process comprising a first extruder and a second extruder;
   d) cutting the dough rope into dairy protein based pellets;
   e) drying said dairy protein based pellets to a moisture level of approximately 9 to 13%; and
   f) puffing said dairy protein based pellets using a puffing machine, thus forming a dairy protein based puffed snack food.

15. The method of claim 14 wherein both said milk protein derivative and at least one of said potato starch or tapioca starch comprise a particle size within the range of about 8 to about 200 microns.

16. The method of claim 14 wherein said dough comprises between about 35% to about 45.25% milk protein.

17. The method of claim 1 wherein said dough comprises:
   a) approximately 21.80%-29.00% tapioca starch;
   b) approximately 25.00%-37.00% potato starch; and
   c) approximately 35.00%-45.25% milk protein.

18. The method of claim 1 wherein said dough comprises between about 35% to about 45.25% milk protein.

19. The method of claim 1 wherein said extruding step comprises extrusion through a twin screw extruder at approximately 1000 to 1400 psi.

20. The method of claim 14 wherein said extruding step comprises extrusion through a twin screw extruder at approximately 1000 to 1400 psi.

21. The method of claim 14 wherein the the first extruder is a twin screw extruder and the second extruder is a single screw extruder.

* * * * *

UNITED STATES PATENT AND TRADEMARK OFFICE
CERTIFICATE OF CORRECTION

PATENT NO. : 8,313,788 B2  
APPLICATION NO. : 12/105896  
DATED : November 20, 2012  
INVENTOR(S) : Jonathan L. Licker et al.

Page 1 of 1

It is certified that error appears in the above-identified patent and that said Letters Patent is hereby corrected as shown below:

Please amend claims 10 and 11 by deleting the word "compromises" and replacing it with "comprises" so that the amended claims read as follows:

10. The method of claim 6 wherein step a) further comprises mixing salt with said starch and protein components.

11. The method of claim 6 wherein step a) further comprises optionally mixing an emulsifier with said starch and protein components.

Please amend claim 30 to delete the second "the" in the first line of the claim that reads "...wherein the the first extruder...", so that the claim reads as follows:

30. The method of claim 23 wherein the first extruder is a twin screw extruder and the second extruder is a single screw extruder.

Signed and Sealed this  
Nineteenth Day of February, 2013

Teresa Stanek Rea  
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 8,313,788 B2 | Page 1 of 1 |
| APPLICATION NO. | : 12/105896 | |
| DATED | : November 20, 2012 | |
| INVENTOR(S) | : Jonathan L. Licker et al. | |

It is certified that error appears in the above-identified patent and that said Letters Patent is hereby corrected as shown below:

Please amend claims 4 and 5 (Original Claims 10 and 11) by deleting the word "compromises" and replacing it with "comprises" so that the amended claims read as follows:

Column 9, lines 8-19, Claim 4 should read
-- 4. The method of claim 1 wherein step a) further comprises mixing salt with said starch and protein components. --

Column 9, lines 20-22, Claim 5 should read
-- 5. The method of claim 1 wherein step a) further comprises optionally mixing an emulsifier with said starch and protein components. --

Please amend claim 21 (Original Claim 30) to delete the second "the" in the first line of the claim that reads "...wherein the the first extruder...", so that the claim reads as follows:

Column 10, lines 44-46, Claim 21 should read
-- 21. The method of claim 14 wherein the first extruder is a twin screw extruder and the second extruder is a single screw extruder. --

This certificate supersedes the Certificate of Correction issued February 19, 2013.

Signed and Sealed this
Nineteenth Day of March, 2013

Teresa Stanek Rea
*Acting Director of the United States Patent and Trademark Office*